(12) United States Patent
Welch et al.

(10) Patent No.: US 6,276,712 B1
(45) Date of Patent: Aug. 21, 2001

(54) SIDE RESTRAINT ASSEMBLY FOR AN AUTOMOTIVE VEHICLE

(75) Inventors: Jeffrey Allen Welch, Washington; Bassam Georges Khoudari, Sterling Heights, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/396,611

(22) Filed: Sep. 15, 1999

Related U.S. Application Data

(63) Continuation-in-part of application No. 09/393,728, filed on Sep. 10, 1999, now abandoned.

(51) Int. Cl.[7] .................................................. B60R 21/22
(52) U.S. Cl. ...................................... 280/730.2; 280/743.2
(58) Field of Search .......................... 280/728.1, 730.1, 280/730.2, 742, 743.2, 729

(56) References Cited

U.S. PATENT DOCUMENTS

| | | | |
|---|---|---|---|
| 3,687,485 | | 8/1972 | Campbell . |
| 3,844,581 | | 10/1974 | Fox . |
| 3,953,049 | | 4/1976 | Surace et al. . |
| 5,322,322 | | 6/1994 | Bark et al. . |
| 5,462,308 | | 10/1995 | Seki et al. . |
| 5,480,181 | * | 1/1996 | Bark et al. ........................ 280/730.2 |
| 5,588,672 | * | 12/1996 | Karlow et al. .................... 280/730.1 |
| 5,788,270 | * | 8/1998 | HAland et al. .................... 280/730.2 |
| 5,865,462 | * | 2/1999 | Robins et al. ..................... 280/730.2 |
| 5,899,491 | * | 5/1999 | Tschaeschke ..................... 280/730.1 |
| 5,941,564 | * | 8/1999 | Acker ................................. 280/743.2 |
| 5,957,487 | * | 9/1999 | Stutz ................................... 280/730.2 |
| 6,010,149 | * | 1/2000 | Riedel et al. ...................... 280/730.2 |
| 6,042,141 | * | 3/2000 | Welch et al. ...................... 280/730.2 |
| 6,073,961 | * | 6/2000 | Bailey et al. ...................... 280/730.2 |
| 6,095,551 | * | 8/2000 | O'Docherty ....................... 280/730.1 |
| 6,135,493 | * | 10/2000 | Jost et al. .......................... 280/730.2 |
| 6,152,481 | * | 11/2000 | Webber et al. ................... 280/730.2 |
| 6,155,597 | * | 12/2000 | Bowers et al. ................... 280/730.2 |
| 6,168,191 | * | 1/2001 | Webber et al. ................... 280/730.2 |
| 6,168,193 | * | 1/2001 | Shirk et al. ....................... 280/730.2 |
| 6,168,194 | * | 1/2001 | Cuevas et al. .................... 280/730.2 |
| 6,173,989 | * | 1/2001 | Stutz ................................... 280/730.2 |
| 6,176,513 | * | 1/2001 | Niedert .............................. 280/730.2 |

FOREIGN PATENT DOCUMENTS

| | | |
|---|---|---|
| 2191450A | 12/1987 | (GB) . |
| 3-276844 | 12/1991 | (JP) . |
| 90/11914 | 10/1990 | (WO) . |

* cited by examiner

Primary Examiner—J. J. Swann
Assistant Examiner—Christopher Bottroff
(74) Attorney, Agent, or Firm—Kathryn A. Marra

(57) ABSTRACT

A side restraint assembly includes a side air bag having a main portion secured to the vehicle roof rail, a tubular portion extending from the main portion and a neck portion connected to an inflator for inflating the side air bag. A braided tube encircles the tubular portion and is secured to the rear pillar. The front of the main portion of the side air bag is secured to the front pillar. When the side air bag is inflated, the braided tube increases in diameter and significantly decreases in length. The decreased length induces tension along the bottom edge of the side air bag thereby positively positioning and retaining the air bag relative to the vehicle. The braided tube has an enlarged bulged portion to enhance the constriction of the braided tube during inflation. A fabric shield may be secured to the braided tube to provide an additional barrier for a rear-seated occupant.

20 Claims, 4 Drawing Sheets

SIDE RESTRAINT ASSEMBLY FOR AN AUTOMOTIVE VEHICLE

This application is a continuation-in-part of U.S. application Ser. No. 09/393,728 filed Sep. 10, 1999 now abandoned entitled SIDE RESTRAINT ASSEMBLY FOR AN AUTOMOTIVE VEHICLE.

FIELD OF THE INVENTION

This invention relates to a side restraint assembly for protecting vehicle occupants.

DESCRIPTION OF THE RELATED ART

Air bags mounted in an instrument panel or steering wheel to protect an occupant from a front impact have become standard in the automotive industry. Numerous variations of these air bags, deployment systems and housing devices have evolved over the years.

Side impact air bag systems are also known in the art. These side impact air bags are often mounted adjacent the vehicle's roof rail, doorframe or center pillars, or in some instances within the side door. For example it is known to provide air bags which have upper head and torso protection which simultaneously inflate from the vehicle door or seat to protect the vehicle occupant during side impact or roll over event.

It is also known in the prior art to provide longitudinally extending rigid inflatable tubes that extend across a selected area of the vehicle between the vehicle pillars as shown in U.S. Pat. Nos. 5,480,181 and 5,322,322. It has also been suggested to provide a side head air bag with a plurality of vertically extending inflatable cells.

It is desirable to provide a side air bag that covers a larger area of the side of the vehicle while simultaneously increasing the stability and tension of the lower portion of the air bag within a single cushion device.

SUMMARY OF THE INVENTION

It is an object of the invention to provide an improved side restraint assembly that improves upon the prior art and other related art.

The present invention is directed to a side restraint assembly with a constricting braided portion to induce tension along the lower edge of the assembly and position the air bag during a side impact, rollover event, or subsequent impact. A side air bag has a main portion secured to the vehicle along the roof rail between the front and rearward pillars. A tubular portion of the side air bag extends from the main portion rearward to an inflator in the rear pillar. The tubular portion of the side air bag is covered with a braided tube made of continuous fibers. A tether connects a front lower portion of the main portion of the side air bag to a lower portion of the front pillar. Upon inflation of the side air bag, the diameter of the braided tube increases and its length decreases significantly. The decreased length induces tension along the bottom edge of the restraint assembly thereby positioning the side restraint assembly within the vehicle. A bulged portion of the braided tube is provided to increase the degree of constriction during inflation and thereby increase the induced tension. When fully inflated, the side air bag curtain provides side impact protection for the head, neck and face and may also, under some circumstances, help to prevent an occupant from being ejected during a roll over event or subsequent impact. A fabric material may also be attached to the braided tube and vehicle roof rail to further protect a rear occupant.

DESCRIPTION OF THE PREFERRED EMBODIMENT

Figure 1:
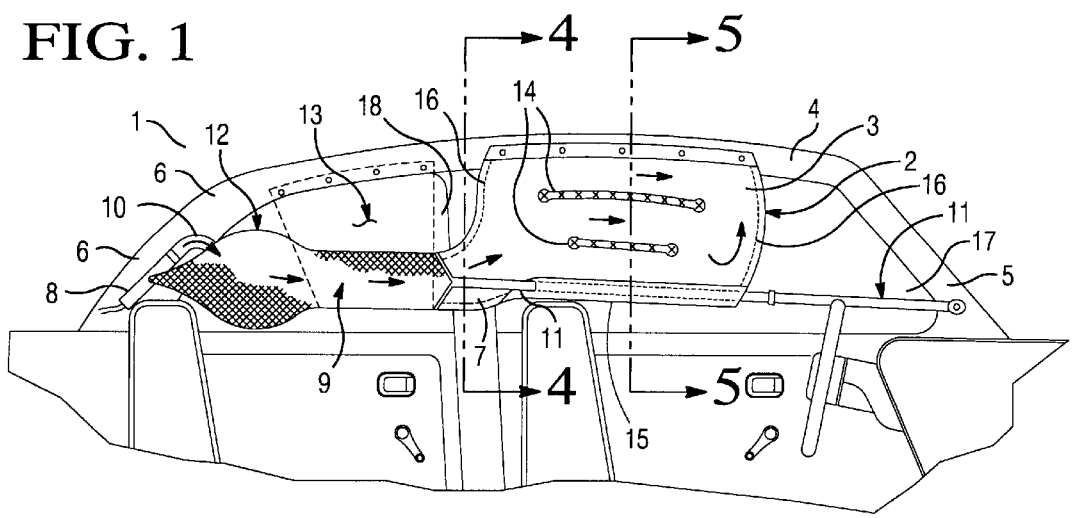
FIG. 1 is an elevation view of a side impact air bag according to the preferred embodiment of the present invention mounted to a vehicle.
Figure 4:
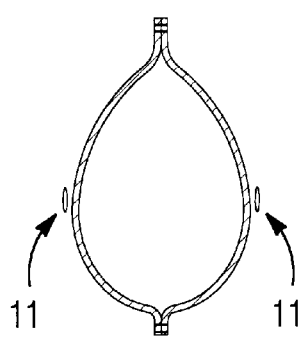
FIG. 4 is a sectional view taken along line 4—4 of FIG. 1.
Figure 5:
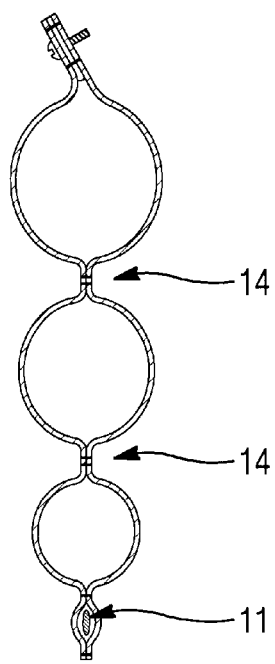
FIG. 5 is a sectional view taken along line 5—5 of FIG. 1.

FIG. 1 is directed to a side restraint assembly of the present invention mounted to an automotive vehicle 1 in a deployed state. A side air bag 2 has a main portion 3 secured to the vehicle roof rail 4 between the front pillar 5 and rearward pillar 6. A tubular portion 7 of the side air bag 2 extends from the main portion 3 to an inflator 8 mounted in a lower portion of the rear pillar 6. However, the inflator 8 may be remotely mounted within the vehicle and connected to the tubular portion 7 of the side air bag 3 via ducting. A braided tube 9 made of continuous fibers substantially covers the tubular portion 7 of the side air bag 2. The braided tube 9 is secured to the rear pillar 6 proximate the inflator 8. A neck portion 10 of the side air bag 2 emerges through the braided tube 9 and connects the inflator 8 to the tubular portion 7. The braided tube 9 is connected to a tether 11 on each side of the air bag 2 which is fed through a sleeve formed in the bottom edge 15 of the main portion 3 of the side air bag 2 and extends to the front pillar 5. FIG. 4 clearly shows each tether 11 disposed on either side of the tubular portion 7 of the air bag 2. FIG. 5 clearly shows tethers 11 disposed within the sleeve formed in bottom edge 15 of the main portion 3 of the side air bag 2. However, tethers 11 may be otherwise secured to the lower portion of the main portion of the side air bag 3 and therefore extend to and are connected to a lower portion of the front pillar 5.

During inflation, gas emerges from inflator 8 and enters the side air bag 2 via neck portion 10. The tubular portion 7 and main portion 3 then begins to inflate and expand. Consequently, the braided tube 9 also expands. When the side air bag 2 inflates, the diameter of the braided tube 9 increases and its length decrease significantly. Because the braided tube 9 length decreases, tension is induced along the tether 11 and braided tube 9. Consequently, the side air bag 2 is held firmly in place. Tethers 11 are free to translate through the sleeve formed in the bottom edge 15 of the main portion 3 of the side air bag 2. Therefore, when tension is induced in the tethers 11, the longitudinal position of the air bag 2 is not disturbed. Preferably, the braided tube 9 includes a substantially enlarged bulge portion 12. This enlarged bulge portion 12 enhances the constriction of the braided tube 9 thereby increasing the induced tension along the bottom of the side restraint assembly.

The side air bag 2 may be made of any suitable air bag material for holding gas, but is preferably made of two sheets of woven nylon fabric lined or coated with urethane or other substantially impervious material. It is noted that the woven nylon fabric may either have urethane coated directly onto the inner surface of the air bag, or a layer of urethane may be simply overlaid on top of the inner surface of the nylon fabric when forming the air bag structure. In either instance, the two urethane coated/lined nylon sheets are secured to one another along an outer periphery 16 thereof to define the overall air bag shape. Moreover, two substantially horizontal spaced apart zero length tethers 14 extend across the main portion of the side air bag. Both the outer periphery 16 of the side air bag and zero length tethers are preferably formed by heating selected portions of the fabric dielectrically. The urethane or silicone coating of each of the two nylon sheets is laid against each other and together line the interior of the inflatable side air bag 2. The inflatable side air bag 2 is then dielectrically treated to heat the outer periphery 16 and zero length tethers 14 causing the coating to adhere to one another. This forms a gas tight seal along the outer peripheral surface 16 and zero length tethers 14. The two coated nylon sheets may also be stitched along the outer periphery 16 and zero length tethers 14 to increase structural integrity sufficient to tolerate loads during inflation. When stitching is employed, it is possible to treat the stitched area with a gas impervious substance to minimize gas leakage. However, it is preferred to maintain the stitching beyond the boundaries of the dielectrically heated weld portions of the air bag to eliminate the need for such treatment of the stitched areas.

An optional fabric shield 13 may be employed to provide additional protection for a rear occupant. The fabric shield 13 includes a fabric of nylon, or other strong material, secured to the rear portion of the roof rail 4 and wrapped around the braided tube 9. The braided tube 9 being simply disposed within the fabric shield 13 much like a sling. The braided tube 9 is free to longitudinally translate within the fabric shield and thereby free to constrict during inflation. The fabric shield 13 forms a barrier between the rear occupant the rear window 18 thereby adding further protection for the rear positioned occupant.

FIG. 4 represents a cross sectional view of side air bag 2 taken along lines 4—4 of FIG. 1 proximate the junction between the main portion 3 and tubular portion 7 of the side air bag 2. As can bee seen in FIG. 4, two tethers are secured to the braided tube 9 one extending on either side of air bag 2. FIG. 5 represents a cross-sectional view of the main portion 3 of the side air bag taken along lines 5—5 of FIG. 5. As can be seen in FIG. 5 the two zero length tethers 14, connecting opposite sides of the side air bag without a significant space there between, divide the main portion 3 of the side air bag 2 into three chambers to control the volume of the main portion 3 of the side air bag when completely inflated. Specifically, the zero length tethers 14 prevent the main portion 3 of the side air bag from forming into a big ball during inflation. The zero length tethers 14 reduce the maximum thickness achieved during inflation.

The combination of the single side air bag 2 with the strong braided tube 9 provides increased strength and tension along the lower edge of the side restraint assembly. The braided tube 9 is preferably made of continuous fibers. Typical fibers include Kevlar™, Nylon, Dacron and polyester fibers. In the unloaded position (when the side restraint assembly is not inflated) the woven fibers form obtuse and acute angles at their intersecting points and consequently form a more elongated tube. When inflation begins the fibers seek an orientation to facilitate a larger volume within the tube 9. Consequently, the diameter of the tube 9 and the substantially spherical bulge portion 12 increases and its length decreases significantly. Specifically, the ratio of the surface area to overall volume is caused to decrease during inflation thus maximizing the volume for a given amount of surface material. When the side restraint assembly and side air bag 2 are filly inflated, the braided tube 9 is expanded significantly. Consequently its length is greatly reduced and tension is induced along the lower edge of the side restraint assembly via the braided tube 9 and tether 11. The side restraint assembly is therefore, positioned in place and increases the likelihood of maintaining the occupant inside the vehicle during a severe collision or rollover event.

The strength of the braided tube 9 also provides structural rigidity of the side air bag 2 about the tubular portion 7 as well as increased strength proximate the initial egress of gas entering from neck portion 10.

The side restraint assembly of the present invention is stored within the front and rear pillars 5/6 and along the vehicle roof rail 4. The first tether 11 connecting the main portion 3 of the side air bag 2 to the front pillar 5 extends along the front pillar 5 when stored. The main portion 3 of the side air bag 2 is connected to the vehicle roof rail 4 along a plurality of point wise connections or in any suitable fashion known in the art. Preferably the main portion 3 of the side air bag 2 extends from a front portion to just behind a front seated occupant or adjacent a center pillar of vehicle so equipped with a central pillar. The main portion 3 of the side air bag 2 provides side impact protection for a front seated occupant and is stored in the roof rail 4 adjacent the front side window 17. The tubular portion 7 of the side air bag 2 together with the braided tube 9 extends rearwardly from the main portion 3. The tubular portion 7 of the side air bag 2 and braided tube 9 together span a distance between the main portion 3 of the air bag 2 and the rear pillar 6.

During a side impact, a sensor sends a signal to inflator 8 which causes gases to flow through the neck portion 10 and through the tubular portion 7 and into the main portion 3 thereby inflating the side air bag 2. As a result the side restraint assembly is forced from its stored position and drops down between the occupant and the side of the vehicle. As the tubular portion 7 of the side air bag 2 expands, the braided tube 9 is also forced to expand. The nature of the braided continuous fibers of the braided tube 9 causes the braided tube 9 to increase in diameter or thickness, and significantly decrease in length. The bulged portion 12 has increased volume which provides additional constriction of the braided tube 9. Constriction of the braided tube 9 induces tension along the bottom edge of the side restraint assembly in the deployed state. Therefore, the side restraint is able to be stored in the increased span up through the rear pillar 6, along the vehicle roofline 4 and down to the lower portion of the front pillar 6. The constricting braided tube 9 takes up significant length to induce tension along the bottom edge of the side restraint assembly to retain and position the side restraint assembly relative to the vehicle 1.

Figure 7:
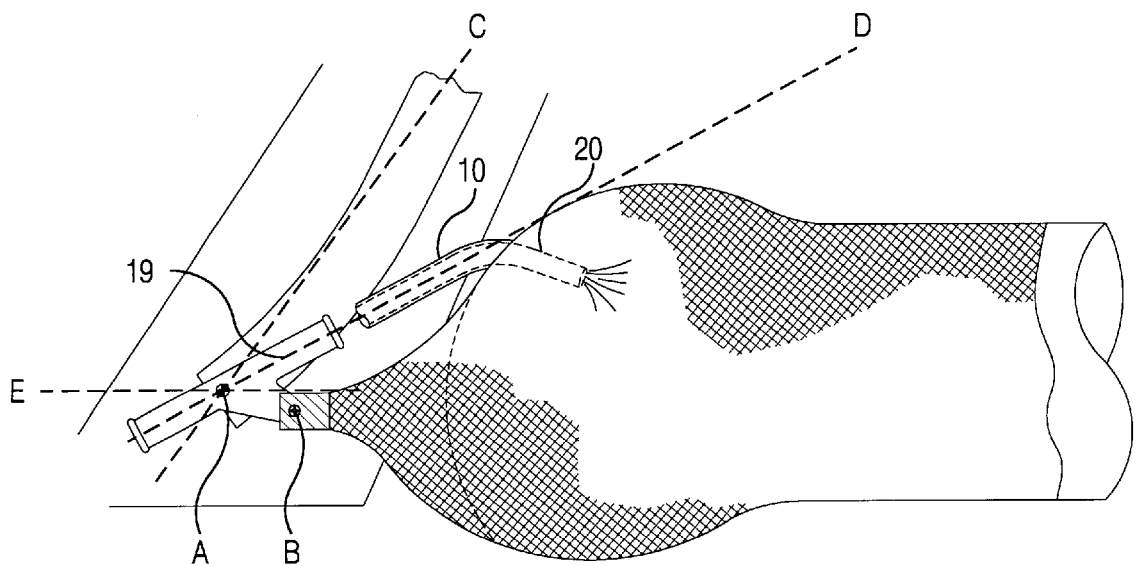
FIG. 7 is an enlarged elevation view of the connection of the side restraint assembly to the rear pillar of FIG. 1 according to one embodiment of the present invention.
Figure 8:
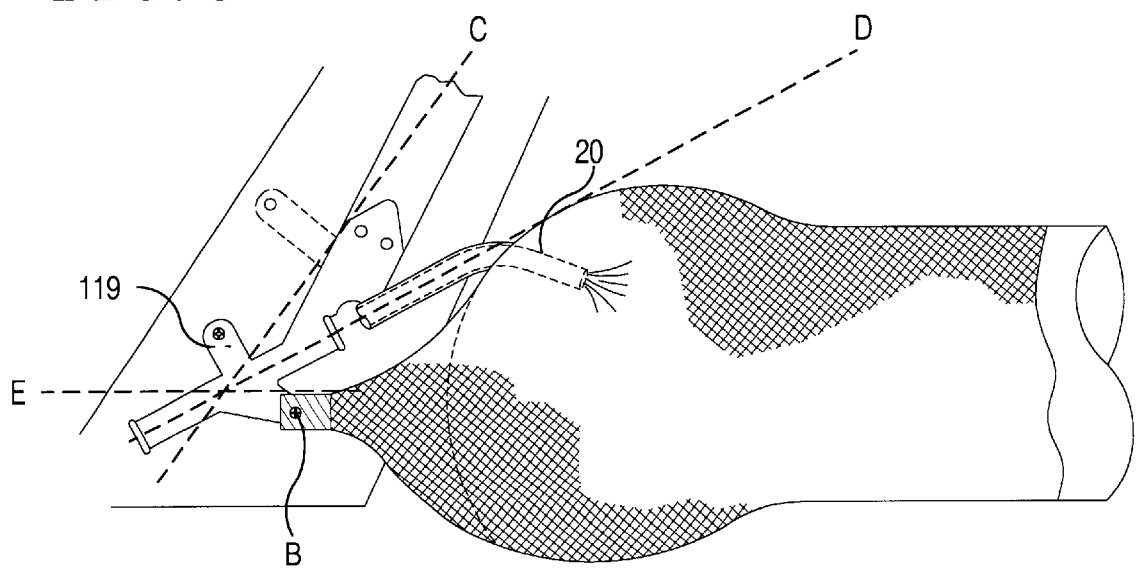
FIG. 8 is an enlarged elevation view of the connection of the side restraint assembly to the rear pillar of FIG. 1 according to one embodiment of the present invention.

FIGS. 7–8 depict alternate embodiments for connecting the braided tube 9, neck portion 10 of the side air bag 2 and inflator 8 to the rear-pillar of the vehicle. When the side restraint assembly is in the stored position, the neck portion 10 and tubular portion 7 of the side air bag extends upward along or within the rear pillar. However, when in the deployed position, the neck portion 10 and tubular portion 7 of the side air bag is oriented substantially in the horizontal position. Therefore, there is a substantial angular difference between the deployed and stored state, which could potentially cause the neck portion 10 of the side air bag to kink either during initial inflation or just prior to deployment.

FIG. 7 depicts a metal bracket 19 that pivotally connects the inflator 8 to the rear pillar 6 about swivel point A. The braided tube 9 is also pivotally connected to the bracket 19 via swivel point B. In the stored position, the inflator and braided tube substantially extend in a direction along the rear pillar. During deployment, when the side air bag 2 and braided tube 9 inflate, the inflator 8 and neck portion 10 of the side air bag 2 together with the braided tube 9 are allowed to rotate or swivel to a substantially horizontal position. In this arrangement, the relative position of neck portion 10 with the inflator 8 remains substantially the same during deployment thus reducing the likelihood of any kinking.

FIG. 8 represents an alternate simple approach to the connection of the neck portion 10. In the embodiment of FIG. 8, the bracket 119, inflator 8 and neck portion 10 are affixed to the lower portion of the rear pillar in a direction D substantially intermediate the direction C along the rear pillar and the horizontal position E assumed by the braided tube 9 in the fully deployed state. Such an arrangement also reduces the potential of any kinking.

Neck portion 10 is preferably reinforced by a neck liner 20 formed of a Kevlar hose disposed within the neck portion 10 and extending from the inflator 8 to within the tubular portion 7 of the side air bag 2. This can be used to strengthen the neck portion 10 during inflation.

Figure 9:
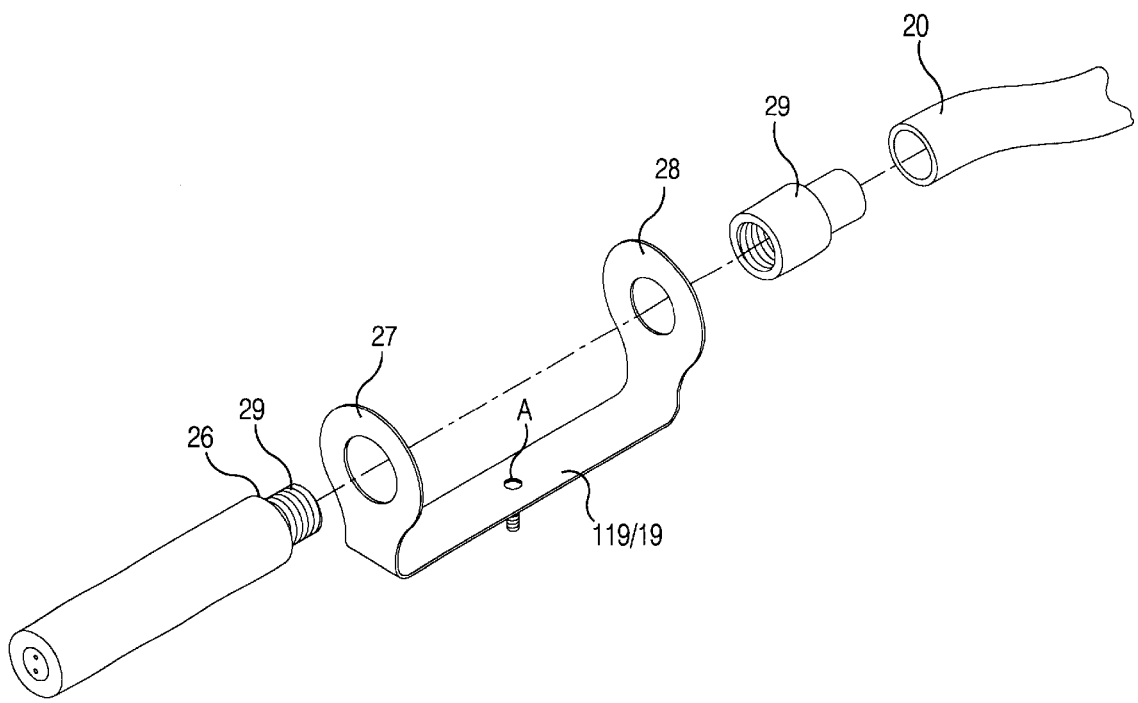
FIG. 9 is an exploded view of the bracket of FIGS. 7 & 8.

FIG. 9 depicts an exploded view of the connection of the inflator 8 with the bracket 19, 119 of the embodiments of FIGS. 7 & 8. The inflator 8 is pushed through first end 27 of the bracket 19. The inflator 8 has a shoulder 26 and a threaded extension 29. The threaded extension 29 of the inflator 8 extends through the second end 28 of the bracket 19. The shoulder 26 of the inflator 8 prevents further displacement of the inflator 8. An adapter screws onto the threaded end of the inflator 8 thereby positively retaining the inflator 8 to the bracket 19. The adapter 29 engages hose 20 to facilitate the flow of discharging gas from the inflator 8 to the side air bag 2. In this arrangement, the inflator is firmly held within the bracket to properly orient the inflator 8 in relation to the neck portion 10 and hose 20 to reduce the potential for any kinking.

Figure 2:
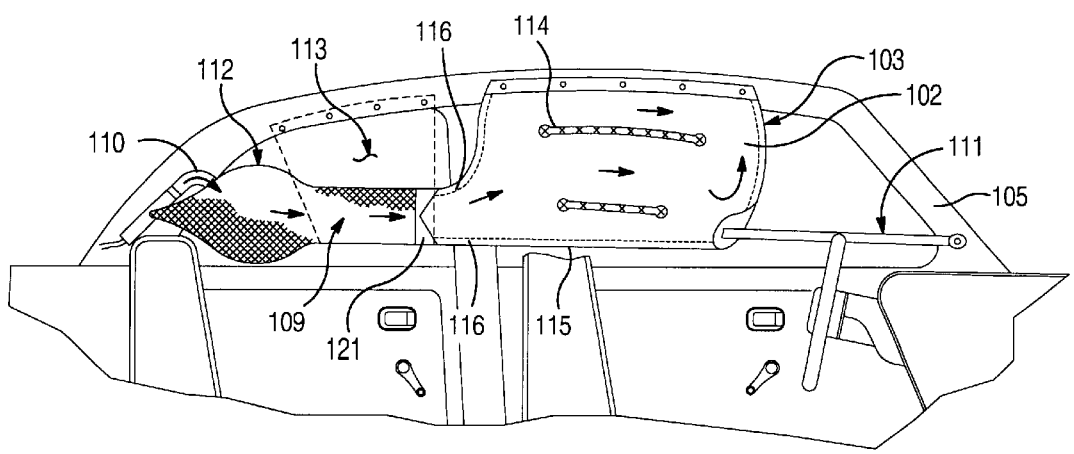
FIG. 2 is an elevation view of a side impact air bag according to an alternate embodiment of the present invention mounted to a vehicle
Figure 3:
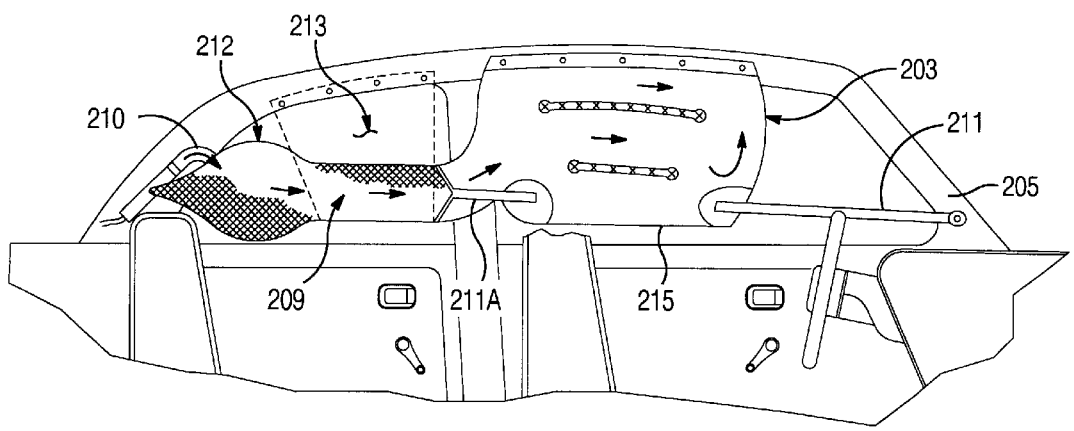
FIG. 3 is an elevation view of a side impact air bag according to an alternate embodiment of the present invention mounted to a vehicle.
Figure 6:
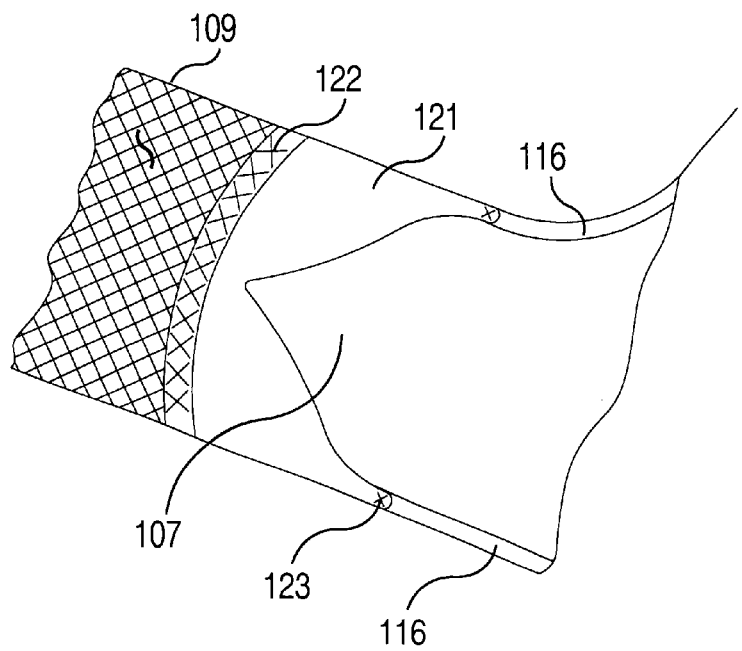
FIG. 6 is an enlarged elevation view of the collar connecting the braided tube and side air bag of the embodiment of FIG. 2.

FIGS. 2 & 3 represent alternative embodiments of present invention. In the embodiment of FIG. 2, the braided tube 109 is connected directly to the side air bag 102 via a collar 121. Thus tension is transferred along the bottom edge 115 of the side air bag 112. Tether 111 connects the front lower portion of the main portion 103 of the side air bag 102 to the front pillar 105. FIG. 6 is an enlarged view of the connecting collar 121. The braid material is secured, fixed, or adhered directly to the collar 121 in any suitable fashion. Preferably the collar 121 is made of nylon fabric, the same material which makes up the air bag 2. The braided tub 9 is simply sewn or stitched directly to the collar 121 as shown generally as reference numeral 122. The rigid collar 121 is in turn secured to the side air bag 102 within the outer periphery 116 as indicated by reference numeral 123. Specifically, the collar is sewn at top and bottom points of the collar through the outer periphery 116 of the tubular portion 107 to maintain the airtight integrity of the air bag 2. It is noted that the collar 116 may also be employed in the embodiment of FIG. 1. In such a case, the collar 112, is rotated ninety degrees in relation to the braided tube 9 and tubular portion 7. The tethers are then sewn or otherwise secured to the collar at points on either side of the air bag 2. Such an arrangement eliminates direct attachment of the tethers 11 to the braided tube 9 and provides additional stitching surface along the braided tube 7.

FIG. 3 represents yet another embodiment of the present invention. FIG. 3 depicts braided tube 209 secured to a first tether 211 A which is in turn secured directly to the bottom edge portion 215 of the main portion 203 of the side air bag 202. A second tether 211 connects the lower front portion of the main portion 203 of the side air bag 202 to the front pillar 205. Thus, as in the embodiment of FIG. 2, tension is induced along the bottom edge of the main portion 203 of the side air bag 202.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A side restraint assembly disposed between a front pillar and a rear pillar within a vehicle, said assembly comprising:

an inflatable side air bag having a tubular portion and an enlarged main portion, said tubular portion extending from said main portion to an inflator, said inflator adapted to inflate said inflatable side air bag;

a first tether connecting said inflatable side air bag to said front pillar of said vehicle; and a braided tube substantially enclosing said tubular portion of said inflatable side air bag, said braided tube secured to said rear pillar, wherein when said inflatable side air bag is inflated, said braided tube decreases its length thereby inducing tension to positively position and retain said side restraint assembly relative to said vehicle.

2. The side restraint assembly according to claim 1, wherein said inflatable side air bag further comprises a neck portion extending from said tubular portion and emerging from a rear portion of said braided tube connecting said side air bag to said inflator to facilitate inflation of said tubular and main portions.

3. The side restraint assembly according to claim 1, wherein said tubular portion of said inflatable side air bag emerges from a front end of said braided tube adjacent said main portion and said main portion includes a top edge secured to a roof rail of said vehicle.

4. The side restraint assembly according to claim 1, wherein said braided tube further comprises an enlarged bulge portion, said bulge portion enhancing a reduction of said length in said braided tube during inflation of said side air bag further inducing tension in said side restraint assembly.

5. The side restraint assembly according to claim 1, wherein said main portion comprises at least one substantially horizontally extending zero-length tethers.

6. The side restraint assembly according to claim 1, wherein said side restraint assembly further comprises a collar connecting said braided tube to said side air bag adjacent a transition between said tubular portion and said main portion.

7. The side restraint assembly according to claim 2, wherein said assembly further comprises a bracket pivotally mounted to a lower portion of said rear pillar, said bracket adapted to pivot between a first position substantially aligned with said rear pillar when said side restraint assembly is in a stored state and a more horizontal position when said assembly is in a deployed state, said bracket forming a connection between said neck portion of said inflatable air bag and said inflator.

8. The side restraint assembly according to claim 7, wherein said braided tube is pivotally mounted to said bracket thereby establishing a pivotable connection between said braided tube and said rear pillar.

9. The side restraint assembly according to claim 2, wherein said assembly further comprises a bracket mounted to a lower portion of said rear pillar, said bracket connected to said neck portion and aligned substantially intermediate a first direction substantially aligned with said rear pillar and a horizontal direction.

10. The side restraint assembly according to claim 1, wherein said first tether is connected to a front end of said braided tube and is secured along a lower edge of said main body portion.

11. The side restraint assembly according to claim 1, wherein said assembly further comprises a second tether interconnecting a front end of said braided tube with an intermediate lower edge of said main portion.

12. The side restraint assembly according to claim 1, wherein said main portion of said inflatable side air bag includes at least one substantially horizontally extending zero length tether interconnecting opposite sides thereof.

13. The side restraint assembly according to claim 2, said assembly further comprising a reinforced neckliner disposed within and reinforcing said neck portion of said inflatable side air bag and extending from said inflator to within said tubular portion.

14. The side restraint assembly according to claim 1, wherein said braided tube is made of woven fibers.

15. The side restraint assembly according to claim 3, wherein said assembly further includes a shield made of fabric secured to said braided tube and said roof rail of said vehicle, said shield providing an additional barrier between a rear seated occupant and an adjacent side of said vehicle.

16. A side restraint assembly disposed between a front and rear pillar within a vehicle for protecting a front and rear seated occupant, said assembly comprising:

a single inflatable side air bag having;

a main portion disposed adjacent a front window and having a top edge secured to a roof rail of said vehicle, said main portion having at least one substantially horizontally extending zero length tether connecting opposite sides of said main portion and a first tether connecting a lower front portion of said main portion to said front pillar;

a tubular portion extending from said main portion toward said rear pillar adjacent said rear window of said vehicle;

a neck portion extending from said tubular portion to an inflator mounted in said rear pillar; said neck portion and said inflator adapted to facilitate egress of discharging air to inflate said tubular portion and said main portion of said single inflatable side air bag;

a braided tube substantially enclosing said tubular portion and extending from said main portion to said rear pillar and being positively secured to said rear pillar, said braided tube having an enlarged bulged portion adjacent a rear end thereof;

a shield member made of fabric secured to said braided tube and said roof rail adjacent said rear window to provide an additional barrier between said rear occupant and said rear window;

wherein when said single inflatable side air bag is inflated, said braided tube substantially decreases in length thereby inducing tension along a bottom edge of said single inflatable side air bag to positively position and retain said side restraint assembly relative to said vehicle.

17. The side restraint assembly according to claim 16, wherein said assembly further comprises a bracket pivotally mounted to a lower portion of said rear pillar, said bracket adapted to pivot between a first position substantially vertically aligned with said rear pillar when said side restraint assembly is in a stored state and a more horizontal position when said assembly is in a deployed state, said bracket forming a connection between said neck portion and said inflator.

18. The side restraint assembly according to claim 17, wherein said braided tube is pivotally mounted to said bracket thereby establishing a pivotable connection between said braided tube and said rear pillar.

19. The side restraint assembly according to claim 1, wherein said assembly further comprises a bracket mounted to a lower portion of said rear pillar, said bracket connected to said neck portion and aligned substantially intermediate a first direction substantially aligned with said rear pillar and a horizontal direction.

20. A side restraint assembly disposed within a vehicle, the assembly comprising:

an inflator for generating inflation gas;

an inflatable side air bag having a tubular portion and an enlarged main portion, said tubular portion extending from said main portion towards said inflator, said inflator for inflating said side air bag;

a braided tube substantially enclosing said tubular portion, said braided tube having one end secured to said enlarged main portion and another end secured to the vehicle, whereby upon side air bag inflation, the braided tube decreases in length to produce tension for positioning the side air bag relative to the vehicle.

* * * * *